US008309647B2

(12) United States Patent
du Fresne von Hohenesche et al.

(10) Patent No.: US 8,309,647 B2
(45) Date of Patent: Nov. 13, 2012

(54) SPHERICAL PARTICLES, METHOD FOR PRODUCTION OF SPHERICAL PARTICLES AND USE THEREOF

(75) Inventors: Cedric du Fresne von Hohenesche, Almere (NL); Stefan Adams, Ludwigshafen (DE); Klaus Dieter Hörner, Lampertheim (DE); Dominik Winter, Wachenheim (DE)

(73) Assignee: BASF SE, Ludwigshafen (DE)

( * ) Notice: Subject to any disclaimer, the term of this patent is extended or adjusted under 35 U.S.C. 154(b) by 542 days.

(21) Appl. No.: 12/522,385

(22) PCT Filed: Dec. 13, 2007

(86) PCT No.: PCT/EP2007/063859
§ 371 (c)(1),
(2), (4) Date: Jul. 8, 2009

(87) PCT Pub. No.: WO2008/083891
PCT Pub. Date: Jul. 17, 2008

(65) Prior Publication Data
US 2010/0048769 A1 Feb. 25, 2010

(30) Foreign Application Priority Data

Jan. 8, 2007 (EP) .................................. 07100229

(51) Int. Cl.
*C08L 29/04* (2006.01)
(52) U.S. Cl. ..... 524/503; 427/334; 428/402; 428/484.1; 524/35; 524/43; 524/275; 524/276; 524/277; 524/458; 524/459; 524/487; 524/490; 524/523; 524/556; 524/700; 524/733; 524/763

(58) Field of Classification Search ................. 427/334; 428/402, 484.1; 524/35, 275, 276, 277, 459, 524/487, 700, 733, 763, 43, 458, 490, 503, 524/523, 556
See application file for complete search history.

(56) References Cited

U.S. PATENT DOCUMENTS 5,369,163 A * 11/1994 Chiou et al. ................. 524/458

FOREIGN PATENT DOCUMENTS

| DE | 18 11 247 | 7/1969 |
|----|-----------|--------|
| DE | 27 02 604 | 7/1978 |
| DE | 42 31 034 | 3/1994 |
| DE | 198 03 098 | 7/1999 |
| EP | 0 437 742 | 7/1991 |
| EP | 0 697 424 | 2/1996 |
| WO | WO-03023071 | 3/2003 |

OTHER PUBLICATIONS

English-language translation of the International Preliminary Report on Patentability for International application PCT/EP2007/063859, mailed Jul. 16, 2009.

* cited by examiner

*Primary Examiner* — David W Wu
*Assistant Examiner* — Marie Reddick
(74) *Attorney, Agent, or Firm* — Connolly Bove Lodge & Hutz LLP

(57) ABSTRACT

Spherical particles having a mean diameter in the range from 1 to 20 μm, comprising
(a) from 85 to 99% by weight of a crosslinked random copolymer having a glass transition temperature $T_g$ in the range from −75 to −40° C.
(b) and from 1 to 15% by weight of at least one organic substance selected from waxes, protective colloids and plasticizers.

18 Claims, No Drawings

SPHERICAL PARTICLES, METHOD FOR PRODUCTION OF SPHERICAL PARTICLES AND USE THEREOF

CROSS REFERENCE TO RELATED APPLICATIONS

This application is a national phase of PCT/EP2007/063859, filed on Dec. 13, 2007, which claims priority to EP 07100229.9 filed Jan. 8, 2007, the entire contents of all are hereby incorporated by reference.

The present invention relates to spherical particles having a mean diameter in the range from 1 to 20 μm, comprising
(a) from 85 to 99% by weight of a crosslinked random copolymer having a glass transition temperature $T_g$ in the range from −75 to −40° C.,
(b) and from 1 to 15% by weight of at least one organic substance selected from waxes, protective colloids and plasticizers.

The present invention furthermore relates to aqueous formulations comprising spherical particles according to the invention. The present invention furthermore relates to a process for the production of spherical particles according to the invention and their use, in particular for coating substrates.

For numerous substrates, such as, for example, leather, imitation leather and textile, a pleasantly matt appearance is desired. In order for such substrates to acquire the desired matt appearance, they are coated. For example, formulations which comprise silica gels or phyllosilicates are used for coating leather.

In some cases, however, matt leather has an unpleasant hand. Furthermore, it is found that matt leather or imitation leather has disadvantages for some applications, such as, for example, seating or automobile seats: movement on the relevant seating while in a sitting position gives rise to noises which are known to the person skilled in the art as "creaking" but are undesired by the customer. In addition, it is observed that the polishability is frequently unsatisfactory.

It was therefore the object to provide substrates, such as, for example, leather or imitation leather or textile or paper, which have a pleasant hand and which, in the case of leather or imitation leather, have low polishability and do not "creak". Furthermore, it was the object to provide a process by means of which it is possible to produce corresponding substrates which have a pleasant hand and which, in the case of leather or imitation leather, have low polishability and do not "creak". Furthermore, it was the object to provide formulations with the aid of which such a process can be carried out.

Accordingly, the spherical particles defined at the outset were found.

In the context of the present invention, spherical particles are understood as meaning spherical or substantially spherical particles which may also have an ellipsoidal shape but for which the diameter at the largest point of the particles is up to at most 20%, preferably up to at most 10%, greater than the smallest diameter. Spherical particles according to the invention are preferably spherical even observed under an optical microscope.

The mean diameter of spherical particles according to the invention is in the range from 1 to 20 μm (microns), preferably from 3 to 8 μm, determined, for example, by means of a Coulter counter.

In an embodiment of the present invention, particles according to the invention have a broad particle diameter distribution; for example, the ratio of the particle diameters at 10% and 90% of the cumulative particle diameter distribution may be in the range of from 2.1 to 6. In another embodiment, particles according to the invention have a narrow particle diameter distribution, i.e. the ratio of the particle diameters at 10% and 90% of the cumulative particle diameter distribution is in the range from 1 to 2.

The particle diameter distribution of particles according to the invention may be monomodal, bimodal or multimodal.

Particles according to the invention comprise
(a) from 85 to 99% by weight, preferably from 90 to 95% by weight, of a crosslinked random copolymer having a glass transition temperature $T_g$ in the range from −75 to −40° C., also referred to as copolymer (a) in the context of the present invention,
(b) and from 1 to 15% by weight, preferably from 5 to 10% by weight, of at least one organic substance selected from waxes, protective colloids and plasticizers, also referred to as organic substance (b) in the context of the present invention.

The data in % by weight are based in each case on the total solid substance of the particles according to the invention.

In an embodiment of the present invention, particles according to the invention may have further constituents, for example organic or in particular inorganic pigment.

In another embodiment of the present invention, particles according to the invention substantially comprise copolymer (a) and organic substance (b). Particles according to the invention preferably comprise no further constituents over and above copolymer (a) and organic substance (b).

Copolymer (a) is described in more detail below.

Copolymer (a) is a crosslinked random copolymer having a glass transition temperature $T_g$ in the range from −75 to −40° C., preferably from −70 to −45° C., determined, for example, by DSC (differential thermal analysis, differential scanning calorimetry) according to DIN 53765.

In an embodiment of the present invention, copolymer (a) is a copolymer which can be prepared by copolymerization, for example emulsion copolymerization and in particular suspension copolymerization.

In an embodiment of the present invention, copolymer (a) is a random copolymer which comprises at least 80% by weight, preferably at least 85% by weight, of at least one comonomer which is incorporated in the form of polymerized units and is selected from $C_4$-$C_{20}$-alkyl(meth)acrylates. Examples of suitable $C_4$-$C_{20}$-alkyl(meth)acrylates are n-butyl(meth)acrylate, n-hexyl(meth)acrylate, 2-ethylhexyl(meth)acrylate, 3-n-propylheptyl(meth)acrylate, n-decyl(meth)acrylate and n-octyl(meth)acrylate, preferably n-butyl acrylate and particularly preferably 2-ethylhexyl acrylate. Data in % by weight are based in each case on total copolymer (a).

In an embodiment of the present invention, copolymer (a) may comprise a plurality of comonomers, selected from $C_4$-$C_{20}$-alkyl(meth)acrylates, incorporated in the form of polymerized units, for example n-butyl acrylate and 2-ethylhexyl acrylate. In the relevant embodiment, the sum of the monomers which are $C_4$-$C_{20}$-alkyl(meth)acrylates is then at least 80% by weight, preferably at least 85% by weight.

Furthermore, copolymer (a) comprises at least one crosslinking agent incorporated in the form of polymerized units. Compounds suitable as crosslinking agents comprise at least two, for example two to four and preferably exactly two ethylenically unsaturated double bonds per molecule. Examples of suitable crosslinking agents are divinylbenzenes, in particular 1,4-divinylbenzene and 1,3-divinylbenzene, diolefins, such as 1,3-butadiene and isoprene, divinyl esters or diallyl esters of dicarboxylic acids, such as, for example, divinyl succinate, diallyl succinate, divinyl glutarate, diallyl glutarate, divinyl adipate, diallyl adipate, diols diesterified with ethylenically unsaturated carboxylic acids, for example ethylene glycol di(meth)acrylate, propylene glycol di(meth)acrylate, diethylene glycol di(meth)acrylate, butane-1,4-diol di(meth)acrylate, hexane-1,6-diol di(meth) acrylate, and furthermore vinyl and allyl esters of ethylenically unsaturated carboxylic acids, such as, for example, vinyl(meth)acrylate and allyl(meth)acrylate, and also triallyl isocyanurate. The (meth)acrylate of so-called tricyclodecenyl alcohol (dihydrotricyclopentadienyl(meth)acrylate) is also suitable.

In an embodiment of the present invention, copolymer (a) comprises no further comonomers incorporated in the form of polymerized units.

In another embodiment of the present invention, copolymer (a) may comprise at least one further comonomer incorporated in the form of polymerized units, for example from one to three comonomers selected from vinylaromatics, such as, for example, α-methylstyrene, para-methylstyrene and in particular styrene, ethylenically unsaturated nitriles, such as, for example, (meth)acrylonitrile, $C_1$-$C_3$-alkyl(meth)acrylate, for example methyl acrylate, ethyl acrylate, ethyl methacrylate, n-propyl(meth)acrylate, isopropyl(meth)acrylate and in particular methyl methacrylate, α-olefins having, for example 6 to 24 carbon atoms, such as, for example, n-hexene, n-octene, n-decene, n-dodecene, n-tetradecene, n-eicosene, α-$C_{22}H_{44}$, α-$C_{24}H_{48}$, and furthermore branched olefins, such as diisobutene, α-triisobutene, α-tetraisobutene, polyisobutenes having 5 to 20 isobutene units per molecule, vinyl esters of $C_1$-$C_{20}$-carboxylic acids, in particular vinyl acetate, vinyl esters of saturated $C_2$-$C_{20}$-alkanols. Ethylenically unsaturated mono- and dicarboxylic acids, such as, for example, itaconic acid, maleic acid, (E)- and (Z)-crotonic acid, preferably acrylic acid and very particularly methacrylic acid, are furthermore suitable.

In an embodiment of the present invention, copolymer (a) comprises at least two of the abovementioned comonomers incorporated in the form of polymerized units. For the purposes of the present invention, the total proportion of abovementioned further comonomers does not exceed 19.9% by weight, based on total copolymer (a).

In an embodiment of the present invention, copolymer (a) comprises the following comonomers incorporated in the form of polymerized units:
in the range of from 80 to 99.9% by weight, preferably from 85 to 90% by weight, of $C_4$-$C_{20}$-alkyl(meth)acrylates,
in the range of from 0.1 to 10% by weight, preferably from 0.2 to 8% by weight, of crosslinking agents and
in the range of from zero to 19.9% by weight, preferably from 1 to 12% by weight, of further comonomer.

Data in % by weight are based in each case on total copolymer (a).

Spherical particles according to the invention further comprise from 1 to 15% by weight, based on the total solid substance of the particles according to the invention, of at least one organic substance (b) selected from waxes, protective colloids and plasticizers.

In the context of the present invention, waxes are understood as meaning substances which are solid at room temperature and may be of natural or synthetic origin, can melt without decomposition and are kneadable, solid to brittle at 20° C., have a coarse to finely crystalline structure and are colored and translucent to opaque but not glassy.

Examples of waxes are natural waxes, such as, for example, beeswax, carnauba wax, candelilla wax, bark wax, ouricoury wax, sugar cane wax, montanic acid wax and montanic ester wax ("montanic esters"), crude montan wax, and in particular synthetic waxes, such as, for example, Fischer-Tropsch waxes, high density polyethylene waxes, for example prepared with the aid of Ziegler-Natta catalysts or metallocene catalysts, and furthermore partially oxidized high density polyethylene waxes having an acid number in the range from 1 to 150 mg KOH/g of wax, determined according to DIN 53402, high density polyethylene waxes comprising not only homopolymer waxes of ethylene but also copolymers of polyethylene with altogether up to 20% by weight of comonomer, such as, for example, propylene, 1-butene, 1-pentene, 1-hexene, 1-octene, 1-decene or 1-dodecene, and in particular paraffin waxes and isoparaffin waxes, for example crude paraffins (crude paraffin waxes), paraffin slack waxes, deoiled crude paraffins (deoiled crude paraffin waxes), semi-refined or completely refined paraffins (semi-refined or completely refined paraffin waxes) and bleached paraffins (bleached paraffin waxes). In the context of the present invention, paraffin waxes are understood as meaning in particular paraffins melting in the range from 25 to 80° C., preferably from 30 to 75° C., i.e. saturated hydrocarbons, branched or straight-chain, cyclic or preferably acyclic, individually or preferably as a mixture of a plurality of saturated hydrocarbons. Paraffin waxes in the context of the present invention are preferably composed of saturated hydrocarbons having 18 to 45 carbon atoms, and isoparaffins in the context of the present invention are preferably composed of saturated hydrocarbons having 20 to 60 carbon atoms.

Waxes which serve as organic substance (b) are preferably selected from paraffin waxes having a melting point of at least 25° C., in particular n-$C_{18}H_{38}$, n-$C_{20}H_{42}$ and higher paraffins, and furthermore from natural waxes, such as, for example, beeswax, carnauba wax and montanic esters.

Particularly preferred waxes are polyisobutenes having a molecular weight, $M_n$ in the range from 300 to 5000 g/mol, preferably from 400 to 3000 g/mol, particularly preferably from 500 to 2300 g/mol, very particularly preferably from 550 to 1500 g/mol, for example determined by means of gel permeation chromatography (GPC). In the context of the present invention, such polyisobutenes can also be referred to as polyisobutene waxes.

In an embodiment of the present invention, polyisobutene waxes have a polydispersity $M_w/M_n$, in the range from 1.1 to 3, preferably from 1.5 to 1.8.

Polyisobutene waxes are known as such and are obtainable, for example, by oligomerization of isobutene in the present of a boron trifluoride catalyst (cf. for example DE-A 27 02 604). Suitable isobutene-containing starting materials are both isobutene itself and isobutene-containing $C_4$-hydrocarbon streams, for example $C_4$-raffinates, $C_4$-cuts from the dehydrogenation of isobutane, $C_4$-cuts from steam crackers or so-called FCC crackers (FCC: fluid catalyzed cracking), provided that relevant $C_4$-cuts have been substantially freed from 1,3-butadiene present therein.

Further particularly preferred waxes are polyolefin waxes, in particular polyethylene waxes having an average molecular weight $M_n$ in the range from 500 to 20,000 g/mol, preferably from 750 to 10,000 g/mol, and polypropylene waxes having an average molecular weight $M_n$ in the range from 750 to 20,000 g/mol, and oxidized polyethylene waxes having an average molecular weight $M_n$ in the range from 500 to 20,000 g/mol, preferably from 750 to 10,000 g/mol, so-called oxidates which can be prepared by partial oxidation of preferably molten polyethylene wax with oxygen or oxygen-containing gasses, such as, for example, air.

Further examples of organic substances (b) are protective colloids. Suitable protective colloids are, for example, polyvinyl alcohols, in particular having a dynamic viscosity in the range from 5 to 60, preferably up to 57, mPa·s (4% by weight in water, measured according to DIN 53015 at 20° C.), and a degree of hydrolysis of from 75 to 99%. Polyethylene oxides, in particular polyethylene oxides which are solid at room temperature, are furthermore suitable. Examples of suitable organic substances are cellulose derivatives (modified cellulose), such as, for example, carboxymethylcellulose, hydroxymethylcellulose and methylhydroxypropylcellulose, in particular having a viscosity of from 20 to 50,000 mPa·s: methylhydroxyethylcellulose, in particular having a viscosity from 100 to 50,000 mPa·s; methylcellulose, in particular having a viscosity of from 10 to 150,000 mPa·s, measured at 20° C. as a 2% by weight solution in water using a Brookfield viscometer, and also cationic polymers, such as, for example, poly-N-vinylimidazole, and anionic polymers, such as, for example, polyacrylic acid.

Particularly preferred protective colloids are polyvinyl alcohols and modified cellulose and mixtures of polyvinyl alcohol and modified cellulose.

In the context of the present invention, plasticizers (or plasticizing compositions) are those organic substances which are incorporated into copolymer (a) and can make it more pliant. Under standard temperature and pressure conditions (1 atm, 20° C.), plasticizer is preferably present in liquid form.

Examples of plasticizers are ester compounds selected from the groups consisting of the aliphatic or aromatic di- or polycarboxylic acids completely esterified with alkanols and phosphoric acid at least monoesterified with alkanol.

In an embodiment of the present invention, alkanols are $C_1$-$C_{10}$-alkanols.

Preferred examples of aromatic di- or polycarboxylic acids completely esterified with alkanol are phthalic acid, isophthalic acid and mellitic acid completely esterified with alkanol; the following may be mentioned by way of example: di-n-octyl phthalate, di-n-nonyl phthalate, di-n-decyl phthalate, di-n-octyl isophthalate, di-n-nonyl isophthalate and di-n-decyl isophthalate.

Preferred examples of aliphatic di- or polycarboxylic acids completely esterified with alkanol are, for example, dimethyl adipate, diethyl adipate, di-n-butyl adipate, diisobutyl adipate, dimethyl glutarate, diethyl glutarate, di-n-butyl glutarate, diisobutyl glutarate, dimethyl succinate, diethyl succinate, di-n-butyl succinate and diisobutyl succinate and mixtures of the abovementioned compounds.

Preferred examples of diaryl phosphate which is at least monoesterified with alkanol are $C_1$-$C_{10}$-alkyl di-$C_6$-$C_{14}$-aryl phosphates, such as isodecyl diphenyl phosphate.

Further suitable examples of plasticizers are aliphatic or aromatic di- or polyols which are at least monoesterified with $C_1$-$C_{10}$-alkylcarboxylic acid.

A preferred example of aliphatic or aromatic di- or polyols which are at least monoesterified with $C_1$-$C_{10}$-alkylcarboxylic acid is 2,2,4-trimethylpentane-1,3-diol monoisobutyrate.

Further suitable plasticizers are polyesters obtainable by polycondensation of aliphatic dicarboxylic acid and aliphatic diol, for example adipic acid or succinic acid and 1,2-propanediol, preferably having an $M_w$ of 200 g/mol, and polypropylene glycol alkylphenyl ether, preferably having an $M_w$ of 450 g/mol.

Further suitable plasticizers are polypropylene glycols etherified with two different alcohols and having a molecular weight $M_w$ in the range from 400 to 800 g/mol, where one of the alcohols can preferably be an alkanol, in particular a $C_1$-$C_{10}$-alkanol, and the other alcohol can preferably be an aromatic alcohol, for example o-cresol, m-cresol, p-cresol and in particular phenol.

The present invention furthermore relates to aqueous formulations comprising spherical particles according to the invention. Aqueous formulations according to the invention may comprise, for example, from 1 to 70% by weight, preferably from 30 to 50% by weight, of spherical particles according to the invention.

In an embodiment of the present invention, aqueous formulations according to the invention have a pH in the range from 5 to 10, preferably from 6 to 9.

In an embodiment of the present invention, aqueous formulations according to the invention may comprise less than 2% of inorganic particles, such as, for example, silica gel or phyllosilicates. In a special embodiment of the present invention, aqueous formulations according to the invention comprise no inorganic particles selected from silica gel and phyllosilicates.

In an embodiment of the present invention, aqueous formulations according to the invention may also comprise one or more additives, for example biocides, film-forming (co)polymers (binders), thickeners or surfactants.

Suitable surfactants are, for example, 1,2-benzisothiazolin-3-one ("BIT") (commercially available as PROXEL® brands from Avecia Lim.) and alkali metal salts thereof; other suitable biocides are 2-methyl-2H-isothiazol-3-one ("MIT") and 5-chloro-2-methyl-2H-isothiazol-3-one ("CIT"). In general, from 10 to 150 ppm of biocide are sufficient, based on total aqueous formulation according to the invention.

Suitable binders are, for example, film-forming polyacrylates and polyurethanes, for example those polyacrylates which comprise (meth)acrylic acid incorporated in the form of polymerized units and at least one comonomer, such as N-methylol(meth)acrylamide, glycidyl(meth)acrylamide or acetoacetyl(meth)acrylate. Examples of particularly suitable binders are to be found in WO 2003/23071. Examples of suitable polyurethanes are to be found in EP-A 0 437 742 and in DE-A 42 31 034.

Suitable thickeners are, for example, crosslinkable copolymers based on acrylic acid and acrylamide and thickeners based on polyurethane or polyvinylpyrrolidone or acrylate (co)polymers. So-called associative thickeners are furthermore suitable, for example those based on polyurethanes, polyureas or polyetherpolyols having a hydrophobic/hydrophilic structure.

Preferred examples of thickeners are copolymers comprising from 85 to 95% by weight of acrylic acid, from 4 to 14% of acrylamide and, if appropriate, up to 1% by weight, preferably from 0.01 to 0.5% by weight, of a (meth)acrylamide derivative of the formula I

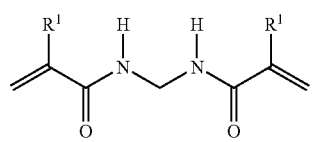

having molecular weights $M_w$ in the range from 100,000 to 200,000 g/mol, in which $R^1$ is selected from methyl and preferably hydrogen.

Further suitable constituents may be one or more surfactants which may be anionic, cationic, zwitterionic or preferably non-ionic.

Suitable anionic surfactants are, for example, alkali metal and ammonium salts of alkyl sulfates (alkyl radical: $C_8$ to $C_{12}$), of sulfuric acid monoesters of ethoxylated alkanols (degree of ethoxylation: from 4 to 30, alkyl radical: $C_{12}$-$C_{18}$) and of ethoxylated alkylphenols (degree of ethoxylation: from 3 to 50, alkyl radical: $C_4$-$C_{12}$), of alkanesulfonic acids (alkyl radical: $C_{12}$-$C_{18}$) and of alkylarylsulfonic acids (alkyl radical: $C_9$-$C_{18}$).

Suitable cationic surfactants are as a rule primary, secondary, tertiary or quaternary ammonium salts, alkanolammonium salts, pyridinium salts, imidazolinium salts, oxazolinium salts, morpholinium salts and thiazolinium salts having a $C_6$-$C_{18}$-alkyl, $C_6$-$C_{18}$-aralkyl or heterocyclic radical and salts of amine oxides, quinolinium salts, isoquinolinium salts, tropylium salts, sulfonium salts and phosphonium salts. Dodecylammonium acetate or the corresponding hydrochloride, the chlorides or acetates of the various 2-(N,N,N-trimethylammonium)ethylparaffinic acid esters, N-cetylpyridinium chloride, N-laurylpyridinium sulfate and N-cetyl-N,N,N-trimethylammonium bromide, N-dodecyl-N,N,N-trimethylammonium bromide, N,N-distearyl-N,N-dimethylammonium chloride and the Gemini surfactant N,N'-(lauryldimethy)ethylenediamine dibromide may be mentioned by way of example. Numerous further examples are to be found in H. Stache, *Tensid-Taschenbuch*, Carl-Hanser-Verlag, Munich, Vienna, 1981, and in McCutcheon's, *Emulsifiers & Detergents*, MC Publishing Company, Glen Rock, 1989.

Suitable non-ionic surfactants are, for example, ethoxylated mono-, di- and trialkylphenols (degree of ethoxylation: from 3 to 50, alkyl radical: $C_4$-$C_{12}$) and ethoxylated fatty alcohols (degree of ethoxylation: from 3 to 80; alkyl radical: $C_8$-$C_{36}$). Examples are the LUTENSOL® brands of BASF Aktiengesellschaft and the TRITON® brands of Union Carbide.

In a preferred embodiment of the present invention, aqueous formulations according to the invention comprise one or more further constituents, for example urea/formaldehyde condensates, melamine/formaldehyde resins, protein or inorganic or preferably organic fillers.

In a preferred embodiment of the present invention, aqueous formulations according to the invention comprise less than 2% by weight of inorganic particles. It is particularly preferable not to admix any inorganic particles with aqueous formulations according to the invention.

In an embodiment of the present invention, aqueous formulations according to the invention comprise
from 5 to 30, preferably at least 10, % by weight of particles according to the invention,
from 1 to 20, preferably at least 3, % by weight of film-forming polymer,
from 0.05 to 5, preferably from 0.2 to 2, % by weight of thickener, based in each case on total aqueous formulation according to the invention.

In an embodiment of the present invention, aqueous formulations according to the invention have a solids content in the range from 10 to 50%, preferably from 15 to 40%.

The present invention furthermore relates to the use of particles according to the invention, for example in the form of aqueous formulations according to the invention, for coating substrates which are preferably fibrous. The present invention furthermore relates to a process for coating substrates, preferably fibrous substrates, using particles according to the invention, for example in the form of aqueous formulations according to the invention.

Suitable substrates are preferably fibrous, for example paper, textile, imitation leather, alcantara and in particular leather. Leather is understood here as meaning the tanned, hydrophobized and fatliquored hide of dead animals, for example of cattle, calves, deer, pigs, goats, kangaroos or sheep. Suitable substrates may furthermore have a bottoming. In a particular embodiment of the present invention suitable leather has a bottoming and a pigmented finish, and particles according to the invention or aqueous formulations according to the invention are applied as a season.

Coating is to be understood here as meaning that particles according to the invention influence the surface topography of a coated substrate and that a significant proportion of particles according to the invention are present on the coated surface. Surfaces coated according to the invention therefore have a matt effect.

In an embodiment of the present invention, only that surface of a substrate which is the visible side during use of the coated substrate is coated and the other surfaces are left substantially uncoated. If it is desired, for example, to coat leather by the process according to the invention, the grain side of leather is preferably coated and the flesh side left uncoated.

The application according to the invention can be carried out by methods known per se, for example roll coating, spreading, spraying, so-called airless spraying, printing, laminating, application with a plush wheel, brushing, pouring or application by atomization. After application of particles according to the invention, it is possible to effect drying, for example at temperatures in the range from 60 to 80° C., and subsequently ironing, for example at temperatures in the range from 90 to 160° C. Subsequent hydraulic plating may also be effected, for example at temperatures in the range from 70 to 100° C. Conventional apparatuses for ironing are suitable, such as, for example, continuous plating machines.

In an embodiment of the present invention, from 2 to 30 g of aqueous formulation according to the invention are applied per m² of substrate surface, in particular leather surface, the amount/m² of season being adapted to the intended use of the substrate, in particular leather, and the data in g/m² being based in each case on the proportion of solids in the relevant aqueous formulation according to the invention. Thus, from 2 to 15 g/m² are preferred for furniture leather and from 5 to 30 g/m² for leather for interior automotive parts.

The present invention furthermore relates to substrates obtainable by the above-described process according to the invention. Substrates according to the invention have a surface with a pleasantly matt appearance in conjunction with an excellent hand. In addition, in the case of leather or imitation leather, they tend neither to creak nor to rustle under mechanical load. Substrates according to the invention are particularly preferably leather coated by the process according to the invention.

Substrates coated according to the invention are moreover soft, do not layer and load one another and can be stacked without sticking.

The present invention furthermore relates to the use of substrates according to the invention for the production of pieces of furniture, in particular of seating, such as, for example, chairs and sofas, or of interior automotive parts, such as, for example, automobile seats, steering wheels and interior door claddings.

The present invention furthermore relates to furniture, in particular seating, for example seats or sofas, or interior automotive parts, such as, for example, automobile seats, steering wheels or interior door claddings, produced from substrates according to the invention. Furniture and interior automotive parts according to the invention have a surface with a pleasantly matt appearance in conjunction with an excellent hand. Moreover, furniture according to the invention and in particular automobile seats according to the invention tend neither to creak nor to rustle under mechanical load.

The present invention furthermore relates to a process for the production of spherical particles having a mean diameter in the range from 1 to 20 µm, wherein
(a) a crosslinked random copolymer having a glass transition temperature $T_g$ in the range from −75 to −40° C. is prepared by suspension polymerization, which copolymer comprises
(b) from 1 to 15% by weight of at least one organic substance selected from waxes, protective colloids and plasticizers.

Crosslinked random copolymers (a) and organic substances (b) are described above.

In an embodiment of the present invention, copolymer (a) copolymer (a) is a copolymer which comprises at least 80% by weight of at least one comonomer incorporated in the form of polymerized units, which is selected from $C_4$-$C_{20}$-alkyl (meth)acrylates.

In an embodiment of the present invention, waxes are selected from paraffin waxes having a melting point of at least 25° C., natural waxes, polyisobutenes having a molecular weight $M_n$ in the range from 400 to 1500 g/mol and polyolefin waxes having an average molecular weight $M_n$ in the range from 500 to 20,000 g/mol.

In an embodiment of the present invention, the protective colloid is polyvinyl alcohol.

The process according to the invention can be carried out, for example, by a procedure in which first one or more organic substances (b), such as, for example, one or more protective colloids, are mixed with water, in particular by dissolving them in water, and a so-called aqueous phase is thus prepared. Thereafter, the comonomers from which it is desired to prepare copolymer (a) are mixed with one another and with the aqueous phase and the mixture is stirred vigorously, for example with a high-speed stirrer, and the copolymerization is then initiated by adding one or more initiators or an initiator system. Furthermore, one or more comonomers may be added during the copolymerization but the addition of one or more comonomers during the polymerization is preferably omitted.

If it is desired to use one or more plasticizers, it is advantageous first to mix this plasticizer or these plasticizers with the comonomers from which it is desired to prepare copolymer (a), and then to add the mixture to the aqueous phase.

If it is desired to use one or more waxes, it is advantageous first to mix the wax or the waxes with the comonomers from which it is desired to prepare copolymer (a) and then to add the mixture to the aqueous phase.

Suitable initiators are free radical initiators, in particular compounds of the general formula $R^2$—N═N—$R^2$, in which $R^2$ is selected, for example, from $C_3$-$C_{10}$-alkyl groups, unsubstituted or preferably substituted by one or more electron-attracting groups, in particular nitrile groups and $CF_3$ groups, such as, for example, AIBN (azobisisobutyronitrile). Further suitable free radical initiators are inorganic and preferably organic peroxides, for example diacetyl peroxide, di-tert-butyl peroxide, diamyl peroxide, dioctanoyl peroxide, didecanoyl peroxide, dilauroyl peroxide (dilauryl peroxide), dibenzoyl peroxide, bis(o-toluyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, di-tert-butyl peroxide, tert-butyl hydroperoxide, cumyl hydroperoxide, tert-butylperoxy-2-ethylhexanoate and diisopropyl peroxydicarbamate.

Furthermore, for example, redox initiators may be used as initiator systems. For example, redox initiators comprising peroxides and one or more oxidizable sulfur compounds, for example systems comprising acetone bisulfite and organic peroxide, such as tert-$C_4H_9$—OOH, comprising $Na_2S_2O_5$ (sodium disulfite) and organic peroxide, such as tert-$C_4H_9$—OOH, or HO—$CH_2SO_2$Na and organic peroxide, such as tert-$C_4H_9$—OOH, may be mentioned. Systems such as, for example, ascorbic acid/$H_2O_2$ or ascorbic acid/tert-butyl hydroperoxide are also suitable.

Copolymerization may be effected at any desired pressure. Atmospheric pressure is preferred.

In an embodiment of the present invention, the process according to the invention can be carried out at temperatures in the range from 30 to 100° C. or, when working at a pressure higher than atmospheric pressure, even at higher temperatures, such as, for example, up to 120° C. or more. Polymerization is preferably effected at a temperature which is below the boiling point of water at the relevant pressure. If it is desired to carry out the process according to the invention at atmospheric pressure, temperatures in the range from 30 to 90° C. are preferred.

In an embodiment of the present invention, copolymerization is effected over a period of from 10 minutes to 24 hours, preferably from two to ten hours.

In an embodiment of the present invention, an initiator or an initiator system which may be the same as or different from the initiator or initiator system which was used for initiating copolymerization is metered in again after the end of the actual polymerization.

It is preferable to mix, in particular to stir, while the process according to the invention is being carried out.

In an embodiment of the present invention, the process according to the invention is carried out using alkali metal nitrite, for example potassium nitrite or sodium nitrite.

In an embodiment of the present invention, the procedure is not effected in the absence of air and oxygen.

At the end of the process according to the invention, the resulting spherical particles according to the invention can be separated off, for example by filtration and washing. The spherical particles according to the invention can then be dried, for example thermally and preferably by spray drying.

By mixing with water and, if appropriate, one or more further substances, spherical particles according to the invention can be processed to give aqueous formulations according to the invention.

The invention is explained by working examples.

General preliminary remark: The glass transition temperature was determined with the aid of a DSC822 (series TA8200) from Mettler-Toledo with a TSO 801RO autosampler. The DSC apparatus was equipped with an FSR5 temperature sensor.

The procedure was effected according to DIN 53765. In each case the second heating curve was used as a basis for evaluation. Cooling in each case to −110° C., heating rate: 20° C./min, heating to 150° C., hold for 5 minutes at 150° C., then cool to −110° C., heating rate: 20° C./min, heating to 150° C.

I. PRODUCTION OF SPHERICAL PARTICLES ACCORDING TO THE INVENTION

I.1 Production of Spherical Particles P.1 According to the Invention

First, an aqueous phase W1 was prepared by stirring the following with one another:
786.7 g of water
138.5 g of protective colloid methylhydroxypropylcellulose as a 5% by weight aqueous solution, commercially available as CULMINAL® MHPC 100

34.7 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79

1.8 g of sodium nitrite as a 2.5% by weight solution in water.

Thereafter, monomer phase M1 was prepared by stirring the following with one another:

341.4 g of 2-ethylhexyl acrylate
23.1 g of 1,4-butanediol diacrylate
20.3 g of methacrylic acid
20.3 g of wax 1 (polyisobutene with $M_n$ 1000 g/mol).

Monomer phase M1 was added to aqueous phase W1 and mixing was effected for 20 minutes at 3300 revolutions per minute (rpm) with the aid of a Dispermat and dissolver disc. An emulsion formed. The emulsion thus prepared was transferred to a polymerization tank having a stirrer and 2 g of a 75% by weight aqueous solution of tert-butyl perpivalate were added. The stirrer speed was adjusted to 150 rpm. Heating to 85° C. was effected in the course of 3 hours and stirring was effected over a period of 3 hours at 85° C. For the purpose of deodorization, 5.80 g of an aqueous solution of tert-butyl hydroperoxide (10% by weight) and 0.32 g of ascorbic acid were added at 85° C. An aqueous suspension of spherical particles P.1 according to the invention was obtained, the pH of which was adjusted to 8 by addition of aqueous ammonia solution (25% by weight).

Analytical data:
Solids content: 29.5%
Mean particle diameter: 7.7 μm
$T_g$: −45.9° C.
Viscosity: 47 mPa·s, determined by means of a Brookfield rheometer at 20° C.

I.2 Production of Spherical Particles P.2 According to the Invention

First, an aqueous phase W2 was prepared by stirring the following with one another:

58.26 kg of water
8.1 kg of protective colloid methylhydroxypropylcellulose as a 5% by weight aqueous solution, commercially available as CULMINAL® MHPC 100
2.03 kg of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
130 g of sodium nitrite as a 2.5% by weight solution in water.

Thereafter, monomer phase M2 was prepared by stirring the following with one another:
24.98 kg of 2-ethylhexyl acrylate
1.69 kg of 1,4-butanediol diacrylate
1.49 kg of methacrylic acid
1.49 kg of wax 2 (1:1 mixture of the linear paraffins $C_{18}H_{38}$ and $C_{20}H_{42}$).

Monomer phase M2 was added to aqueous phase W2 and mixing was effected for 2 hours at 4720 rpm with the aid of a stirrer. An emulsion formed. The emulsion thus prepared was transferred to a polymerization tank having a stirrer and 150 g of a 75% by weight aqueous solution of tert-butyl perpivalate were added. The stirrer speed was adjusted to 80 rpm. Heating to 85° C. was effected in the course of 3 hours and stirring was effected over a period of 3 hours at 85° C. For the purpose of deodorization, 420 g of an aqueous solution of tert-butyl hydroperoxide (10% by weight) and 22.54 g of ascorbic acid were added at 85° C. An aqueous suspension of spherical particles P.2 according to the invention was obtained.

Analytical data:
Solids content: 29.0%
Mean particle diameter: 3.3 μm
$T_g$: −55.3° C.
Viscosity: 39 mPa·s, determined by means of a Brookfield rheometer at 20° C.

I.3 Production of Spherical Particles P.3 According to the Invention

First, an aqueous phase W3 was prepared by stirring the following with one another:

56.04 kg of water
9.95 kg of protective colloid methylhydroxypropylcellulose as a 5% by weight aqueous solution, commercially available as CULMINAL® MHPC 100
2.49 kg of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
1.3 g of sodium nitrite as a 2.5% by weight solution in water.

Thereafter, monomer phase M3 was prepared by stirring the following with one another:
24.6 kg of 2-ethylhexyl acrylate
1.66 kg of 1,4-butanediol diacrylate
1.46 kg of methacrylic acid
1.46 kg of wax 2 (1:1 mixture of the linear paraffins n-$C_{18}H_{38}$ and n-$C_{20}H_{42}$).

Monomer phase M3 was added to aqueous phase W3 and mixing was effected for one hour at 2950 rpm with the aid of a stirrer. An emulsion formed. The emulsion thus prepared was transferred to a polymerization tank having a stirrer and 150 g of a 75% by weight aqueous solution of tert-butyl perpivalate were added. The stirrer speed was adjusted to 80 rpm. Heating to 85° C. was effected in the course of 3 hours and stirring was effected over a period of 3 hours at 85° C. For the purpose of deodorization, 420 g of an aqueous solution of tert-butyl hydroperoxide (10% by weight) and 22.54 g of ascorbic acid were added at 85° C. An aqueous suspension of spherical particles P.3 according to the invention was obtained, the pH of which was adjusted to 8.6 by addition of aqueous ammonia solution (25% by weight).

Analytical data:
Solids content: 28.7%
Mean particle diameter: 4.2 μm
$T_g$: −49.8° C.
Viscosity: 41 mPa·s, determined by means of a Brookfield rheometer at 20° C.

I.4 Production of Spherical Particles P.4 According to the Invention

First, an aqueous phase W4 was prepared by stirring the following with one another:
578.3 g of water
102.6 g of protective colloid methylhydroxypropylcellulose as a 5% by weight aqueous solution, commercially available as CULMINAL® MHPC 100

25.7 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79

1.3 g of sodium nitrite as a 2.5% by weight solution in water.

Thereafter, monomer phase M4 was prepared by stirring the following with one another:
252.9 g of 2-ethylhexyl acrylate
17.1 g of 1,4-butanediol diacrylate
15 g of methacrylic acid
15 g of wax 1 (polyisobutene with $M_n$ 1000 g/mol).

Monomer phase M4 was added to aqueous phase W4 and mixing was effected for 20 minutes at 3300 revolutions per minute (rpm) with the aid of a Dispermat and dissolver disc. An emulsion formed. The emulsion thus prepared was transferred to a polymerization tank having a stirrer and 2 g of a 75% by weight aqueous solution of tert-butyl perpivalate were added. The stirrer speed was adjusted to 150 rpm. Heating to 85° C. was effected in the course of 3 hours and stirring was effected over a period of 3 hours at 85° C. For the purpose of deodorization, 5.80 g of an aqueous solution of tert-butyl hydroperoxide (10% by weight) and 0.32 g of ascorbic acid were added at 85° C. An aqueous suspension of spherical particles P.4 according to the invention was obtained, the pH of which was adjusted to 8 by addition of aqueous ammonia solution (25% by weight).

Analytical data:
Solids content: 29.6%
Mean particle diameter: 8.1 µm
$T_g$: −49.3° C.
Viscosity: 38 mPa·s, determined by means of a Brookfield rheometer at room temperature

I.5 Production of Spherical Particles P.5 According to the Invention

First, an aqueous phase W5 was prepared by stirring the following with one another:
578.3 g of water
102.6 g of protective colloid methylhydroxypropylcellulose as a 5% by weight aqueous solution, commercially available as CULMINAL MHPC 100
25.7 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
1.3 g of sodium nitrite as a 2.5% by weight solution in water.

Thereafter, monomer phase M5 was prepared by stirring the following with one another:
252.9 g of 2-ethylhexyl acrylate
17.1 g of 1,4-butanediol diacrylate
15 g of methacrylic acid
15 g of wax 2 (1:1 mixture of the linear paraffins n-$C_{18}H_{38}$ and n-$C_{20}H_{42}$).

Monomer phase M5 was added to aqueous phase W5 and mixing was effected for 20 minutes at 3300 revolutions per minute (rpm) with the aid of a Dispermat and dissolver disc. An emulsion formed. The emulsion thus prepared was transferred to a polymerization tank having a stirrer and 2 g of a 75% by weight aqueous solution of tert-butyl perpivalate were added. The stirrer speed was adjusted to 150 rpm. Heating to 85° C. was effected in the course of 3 hours and stirring was effected over a period of 3 hours at 85° C. For the purpose of deodorization, 5.80 g of an aqueous solution of tert-butyl hydroperoxide (10% by weight) and 0.32 g of ascorbic acid were added at 85° C. An aqueous suspension of spherical particles P.5 according to the invention was obtained, the pH of which was adjusted to 8 by addition of aqueous ammonia solution (25% by weight).

Analytical data:
Solids content: 29.1%
Mean particle diameter: 8.1 µm
$T_g$: −48.7° C.
Viscosity: 37 mPa·s, determined by means of a Brookfield rheometer at room temperature

I.6 Production of Spherical Particles P.6 According to the Invention

First, an aqueous phase W6 was prepared by stirring the following with one another:
278.6 g of water
119.4 g of protective colloid methylhydroxypropylcellulose as a 5% by weight aqueous solution, commercially available as CULMINAL® MHPC 100
29.9 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
1.9 g of sodium nitrite as a 2.5% by weight solution in water.

Thereafter, monomer phase M6 was prepared by stirring the following with one another:
368.1 g of 2-ethylhexyl acrylate
24.9 g of 1,4-butanediol diacrylate
21.9 g of methacrylic acid
21.9 g of wax 2 (1:1 mixture of the linear paraffins n-$C_{18}H_{38}$ and n-$C_{20}H_{42}$).

Monomer phase M6 was added to aqueous phase W6 and mixing was effected for 20 minutes at 3300 revolutions per minute (rpm) with the aid of a Dispermat and dissolver disc. An emulsion formed. The emulsion thus prepared was transferred to a polymerization tank having a stirrer and 2 g of a 75% by weight aqueous solution of tert-butyl perpivalate were added. The stirrer speed was adjusted to 150 rpm. Heating to 85° C. was effected in the course of 3 hours and stirring was effected over a period of 3 hours at 85° C. For the purpose of deodorization, 5.80 g of an aqueous solution of tert-butyl hydroperoxide (10% by weight) and 0.32 g of ascorbic acid were added at 85° C. An aqueous suspension of spherical particles P.6 according to the invention was obtained, the pH of which was adjusted to 8 by addition of aqueous ammonia solution (25% by weight).

Analytical data:
Solids content: 49.4%
Mean particle diameter: 7.3 µm
$T_g$: −55.3° C.
Viscosity: 256 mPa·s, determined by means of a Brookfield rheometer at room temperature

I.7 Production of Spherical Particles P.7 According to the Invention

According to the Invention but without Use Example

First, an aqueous phase W7 was prepared by stirring the following with one another:
866.2 g of water
34.2 g of protective colloid methylhydroxypropylcellulose as a 5% by weight aqueous solution, commercially available as CULMINAL® MHPC 100

8.55 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79

0.43 g of sodium nitrite as a 2.5% by weight solution in water.

Thereafter, monomer phase M7 was prepared by stirring the following with one another:

85.0 g of n-butyl acrylate
5.0 g of 1,4-butanediol diacrylate
5.0 g of methacrylic acid
5.0 g of wax 2 (1:1 mixture of the linear paraffins n-$C_{18}H_{38}$ and n-$C_{20}H_{42}$).

Monomer phase M7 was added to aqueous phase W7 and mixing was effected for 20 minutes at 2800 rpm with the aid of a Dispermat and dissolver disc. An emulsion formed. The emulsion thus prepared was transferred to a polymerization tank having a stirrer and 0.5 g of tert-butyl pivalate was added. The stirrer speed was adjusted to 150 rpm. Heating to 85° C. was effected in the course of 3 hours and stirring was effected over a period of 3 hours at 85° C. For the purpose of deodorization, 1.42 g of an aqueous solution of tert-butyl hydroperoxide (10% by weight) and 0.08 g of ascorbic acid were added at 85° C. An aqueous suspension of spherical particles P.7 according to the invention was obtained, the pH of which was adjusted to 8 by addition of aqueous ammonia solution (25% by weight).

Analytical data:
Solids content: 6.7%
Mean particle diameter: 9.1 μm
$T_g$: −40.5° C.
Viscosity: 15 mPa·s, determined by means of a Brookfield rheometer at room temperature I.8 Production of Spherical Particles C-P.8

Comparative Experiment

First, an aqueous phase W8 was prepared by stirring the following with one another:
571.8 g of water
102.6 g of protective colloid methylhydroxypropylcellulose as a 5% by weight aqueous solution, commercially available as CULMINAL® MHPC 100
25.7 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
1.3 g of sodium nitrite as a 2.5% by weight solution in water.

Thereafter, monomer phase M8 was prepared by stirring the following with one another:
255.0 g of methyl methacrylate (85%)
15.0 g of 1,4-butanediol diacrylate (5.0%)
15.0 g of methacrylic acid (5.0%)
15.0 g of wax 2 (1:1 mixture of the linear paraffins n-$C_{18}H_{38}$ and n-$C_{20}H_{42}$).

Monomer phase M8 was added to aqueous phase W8 and mixing was effected for 20 minutes at 3300 revolutions per minute (rpm) with the aid of a Dispermat and dissolver disc. An emulsion formed. The emulsion thus prepared was transferred to a polymerization tank having a stirrer and 1.5 g of a 75% by weight aqueous solution of tert-butyl perpivalate were added. The stirrer speed was adjusted to 150 rpm. Heating to 85° C. was effected in the course of 3 hours and stirring was effected over a period of 3 hours at 85° C. For the purpose of deodorization, 4.27 g of an aqueous solution of tert-butyl hydroperoxide (10% by weight) and 0.24 g of ascorbic acid were added at 85° C. An aqueous suspension of spherical particles C-P.8 was obtained, the pH of which was adjusted to 8 by addition of aqueous ammonia solution (25% by weight).

Analytical data:
Solids content: 26.5%
Mean particle diameter: 12.1 μm
$T_g$: +107.5° C.
Viscosity: 32 mPa·s, determined by means of a Brookfield rheometer at 20° C.

I.9 Production of Spherical Particles C-P.9

Comparative Experiment

First, an aqueous phase W9 was prepared by stirring the following with one another:
574.3 g of water
102.6 g of protective colloid methylhydroxypropylcellulose as a 5% by weight aqueous solution, commercially available as CULMINAL® MHPC 100
25.7 g of polyvinyl alcohol (partly hydrolyzed polyvinyl acetate) as a 10% by weight aqueous solution, viscosity: 15 mPa·s according to DIN 53015 (measured as a 4% by weight aqueous solution at 20° C.), hydrolysis number: 200 mg KOH/g, determined according to DIN 53401, as a protective colloid, commercially available as MOWIOL® 15-79
1.3 g of sodium nitrite as a 2.5% by weight solution in water.

Thereafter, monomer phase M9 was prepared by stirring the following with one another:
255.0 g of styrene
15.0 g of 1,4-butanediol diacrylate
15.0 g of methacrylic acid
15.0 g of wax 2 (1:1 mixture of the linear paraffins n-$C_{18}H_{38}$ and n-$C_{20}H_{42}$).

Monomer phase M9 was added to aqueous phase W9 and mixing was effected for 20 minutes at 2800 rpm with the aid of a Dispermat and dissolver disc. An emulsion formed. The emulsion thus prepared was transferred to a polymerization tank having a stirrer and 3.9 g of dilauryl peroxide were added. The stirrer speed was adjusted to 150 rpm. Heating to 85° C. was effected in the course of 3 hours and stirring was effected over a period of 3 hours at 85° C. For the purpose of deodorization, 4.27 g of an aqueous solution of tert-butyl hydroperoxide (10% by weight) and 0.24 g of ascorbic acid were added at 85° C. An aqueous suspension of spherical particles C-P.9 was obtained, the pH of which was adjusted to 8 by addition of aqueous ammonia solution (25% by weight).

Analytical data:
Solids content: 27.1%
Mean particle diameter: 10.6 μm
$T_g$: +106.4° C.
Viscosity: 34 mPa·s, determined by means of a Brookfield rheometer at 20° C.

II. PREPARATION OF AQUEOUS FORMULATIONS ACCORDING TO THE INVENTION AND COMPARATIVE EXAMPLE

In each case a binder prepared by emulsion copolymerization according to example 6 of WO 03/023071 from methacrylic acid, methyl methacrylate, n-butyl acrylate and acrylamide, as an aqueous dispersion having a solids content of 35%, was used as A dispersion (note: methacrylic acid was used instead of acrylic acid) Stated amounts of particles according to the invention and A dispersion are based on the solids content of the respective dispersion.

II.1 Preparation of Aqueous Formulations According to the Invention and Formulations for the Comparative Examples The thickener solution used in each case was an aqueous formulation comprising:
26% by weight of polyethylene oxide blocked at both ends with $C_{16}$-$C_{18}$-fatty alcohol and having an $M_n$ of 20,000 g/mol and $M_w$ of 30,000 g/mol
11% by weight of diethylene glycol mono-n-butyl ether ("butyldiglycol")
2% by weight of N-methylpyrrolidone
61% by weight of water.
The following were mixed for the comparative examples:
70 g of A dispersion
2.1 g of amorphous silica
3.2 g of thickener solution
24.7 g of distilled water.
A precursor of comparative formulation C-F.1 was obtained. The precursor had a solids content of 29.8%.
The following were furthermore mixed:
57.9 g of A dispersion
1.9 g of amorphous silica
2.9 g of thickener solution
37.3 g of distilled water.
A precursor of comparative formulation C-F.2 was obtained. The precursor had a solids content of 25.1%.
General working method: Particles according to the invention were mixed with A dispersion according to table 1. The aqueous formulations according to the invention, as shown in table 1, were obtained.

TABLE 1

Composition of aqueous formulations according to the invention and comparative samples.

| Number | Particles, amount [g of solid] | A dispersion [solid] |
|---|---|---|
| F.3 | 70 g P.2 | 30 g |
| F.4 | 60 g P.2 | 40 g |
| C-F.5 | 60 g P.2 | 20 g + 20 g C.F-1 |
| F.6 | 70 g P.2 | 30 g |
| F.7 | 65.6 g P.5 | 30 g |
| F.8 | 66.5 g P.4 | 30 g |
| F.9 | 39 g P.6 | 30 g |
| F.10 | 66.5 g P.4 | 30 g |
| F.11 | 66.7 g P.1 | 30 g |

TABLE 1-continued

Composition of aqueous formulations according to the invention and comparative samples.

| Number | Particles, amount [g of solid] | A dispersion [solid] |
|---|---|---|
| F.12 | 68.5 g P.3 | 30 g |
| F.13 | 70 g P.2 | 30 g |

III. COATING OF LEATHER

III.1 Coating with the Aid of Aqueous Formulations F.3 to F.13 According to the Invention and with Comparative Formulations C-F.1 to C-F.2

The following were added in each case to 100 g of the mixtures or precursors described under II:
9 g of a 70% by weight solution of a water-emulsifiable hexamethylene diisocyanate according to EP 0 697 424, example 2,
7.5 g of a 45% by weight aqueous dispersion of polydimethylsiloxane (dimethylpolysiloxane)
1.5 g of a mixture of $H(OCH_2CH_2)_3$—O—$(CH_2)_3$—$Si(CH_3)$ $[OSi(CH_3)_3]_2$ and oxyalkylated tridecanol (1:1) in water/dipropylene glycol monomethyl ether (1:2)
and made up to 200 g with water. The viscosity was adjusted to 18 s efflux time according to DIN 53211 with thickener solution from II.
Ready-to-use spray liquors were obtained.
2 spray coats were applied to uniformly bottomed leather, with intermediate drying. For this purpose, one spray coat each of 1.4 and 1.2 g/DIN A4 paste was applied and dried in each case for 10 min at 80° C. in a through-circulation drying oven. Comparative leather C-L.1, comparative leather C-L.2 and C-L.5 and the leathers L.3, L.4 and L.6 to L.13 according to the invention, as shown in table 2, were obtained.
Flexibility, e.g. wet flex, tested using a Bally flexometer, according to IUP/20, DIN 53351 and with 20,000 flexes, wet rub fastness, tested by means of a VESLIC rub fastness tester according to DIN 53339 1000×, gloss, measured using a gloss-measuring apparatus from Lange, at 60° angle before and after 2000 dry rubs with VESLIC rub fastness tester, and optical properties, especially black depth, visually, and haptic properties, manually, were rated. After such a rubbing process, leathers according to the invention showed substantially lower gloss values than the comparative experiments or a smaller difference in gloss after/before dry rubbing. The higher the gloss, the lower is the polishability.
The acoustic properties (the so-called creaking) was determined by generating noise by manual rubbing. A distinction is made between "strong rustling" (strong "creaking"), and "moderate rustling" (audible "creaking") and "hardly any rustling" (inaudible "creaking").

TABLE 2

Properties of leathers according to the invention

| Particle | Leather | | Wet flex 20 000 x | Wet rub 1000 x | Dry rub 2000 x | Gloss before dry rub | Gloss after dry rub | Optical properties | Haptic properties | Acoustic properties |
|---|---|---|---|---|---|---|---|---|---|---|
| SiO$_2$ | C-F.1 | C-L.1 | 5 | 5 | 5 | 1.7 | 2.7 | light grey | rough hand | strong rustling |
| P.2 | F.3 | L.3 | 5 | 5 | 5 | 1.2 | 1.4 | deep black | soft, velvety | hardly any rustling |
| P.2 | F.4 | L.4 | 5 | 5 | 5 | 1.6 | 1.8 | deep black | soft, velvety | hardly any rustling |
| P.2 | C-F.5 | C-L.5 | 5 | 5 | 5 | 0.7 | 1.6 | deep black | soft, velvety | moderate rustling |
| P.2 | F.6 | L.6 | 5 | 5 | 5 | 1.3 | 1.7 | deep black | soft, velvety | hardly any rustling |
| P.5 | F.7 | L.7 | 5 | 5 | 5 | 0.7 | 1 | deep black | soft, velvety | hardly any rustling |
| P.4 | F.8 | L.8 | 5 | 5 | 5 | 0.5 | 0.9 | deep black | soft, velvety | hardly any rustling |
| P.6 | F.9 | L.9 | 5 | 5 | 5 | 0.6 | 0.9 | deep black | soft, velvety | hardly any rustling |
| SiO$_2$ | C-F.2 | C-L.2 | 5 | 5 | 5 | 1.4 | 3 | light grey | rough hand | strong rustling |

TABLE 2-continued

Properties of leathers according to the invention

| Particle | Leather | Wet flex 20 000 x | Wet rub 1000 x | Dry rub 2000 x | Gloss before dry rub | Gloss after dry rub | Optical properties | Haptic properties | Acoustic properties |
|---|---|---|---|---|---|---|---|---|---|
| P.4 | F.10 | L.10 | 5 | 5 | 5 | 0.7 | 1 | deep black | soft, velvety | hardly any rustling |
| P.1 | F.11 | L.11 | 5 | 5 | 5 | 0.7 | 1.1 | deep black | soft, velvety | hardly any rustling |
| P.3 | F.12 | L.12 | 5 | 4-5 | 5 | 1.1 | 1.3 | deep black | soft, velvety | hardly any rustling |
| P.2 | F.13 | L.13 | 5 | 5 | 5 | 1.3 | 1.7 | deep black | soft, velvety | hardly any rustling |

We claim:

1. A spherical particle having a mean diameter in the range from 1 to 20 μm, comprising
   (a) from 85 to 99% by weight based on the spherical particle of a crosslinked random copolymer having a glass transition temperature $T_g$ in the range from −75 to −40° C. and
   (b) from 1 to 15% by weight based on the spherical particle of at least one organic substance selected from the group consisting of waxes, protective colloids, plasticizers.

2. The particle according to claim 1, wherein copolymer (a) is a copolymer which comprises at least 80% by weight of at least one comonomer which is incorporated in the form of polymerized units and is selected from $C_4$-$C_{20}$-alkyl(meth)acrylates.

3. The particle according to claim 2, wherein waxes are selected from paraffin waxes having a melting point of at least 25° C., natural waxes, polyisobutenes having an average molecular weight $M_n$ in the range from 400 to 1500 g/mol and polyolefin waxes having an average molecular weight $M_n$ in the range from 500 to 20 000 g/mol.

4. The particle according to claim 2, wherein the protective colloid is polyvinyl alcohol or modified cellulose.

5. An aqueous formulation comprising the spherical particle according to claim 2.

6. The particle according to claim 1, wherein the waxes are selected from paraffin waxes having a melting point of at least 25° C., natural waxes, polyisobutenes having a molecular weight $M_n$ in the range from 400 to 1500 g/mol and polyolefin waxes having an average molecular weight $M_n$ in the range from 500 to 20 000 g/mol.

7. The particle according to claim 6, wherein the protective colloid is polyvinyl alcohol or modified cellulose.

8. The particle according to claim 1, wherein the protective colloid is polyvinyl alcohol or modified cellulose.

9. An aqueous formulation comprising the spherical particle according to claim 1.

10. The aqueous formulation according to claim 9, which comprises less than 2% by weight of inorganic particles.

11. A process for coating a substrate comprising applying a particle according to claim 1 or aqueous formulations thereof to the substrate.

12. The process according to claim 11, wherein the substrate is leather.

13. A coated substrate obtained by a process according to claim 11.

14. An interior automotive part or piece of furniture comprising the substrate according to claim 13.

15. A process for the production of spherical particles having a mean diameter in the range from 1 to 20 μm, comprising preparing by suspension polymerization
   (a) a crosslinked random copolymer having a glass transition temperature $T_g$ in the range from −75 to −40° C. in the presence of
   (b) at least one organic substance selected from the group consisting of waxes, protective colloids, and plasticizers,
      wherein the spherical particle comprises from 85 to 99% by weight based on the spherical particle of the crosslinked random copolymer and 1 to 15% by weight based on the spherical particle of the at least one organic substance.

16. The process according to claim 15, wherein copolymer (a) is a copolymer which comprises at least 80% by weight of at least one comonomer which is incorporated in the form of polymerized units and is selected from $C_4$-$C_{20}$-alkyl(meth)acrylates.

17. The process according to claim 15, wherein the waxes are selected from paraffin waxes having a melting point of at least 25° C., natural waxes, polyisobutenes having an average molecular weight $M_n$ in the range from 400 to 1500 g/mol and polyolefin waxes having an average molecular weight $M_n$ in the range from 500 to 20 000 g/mol.

18. The process according to claim 15, wherein the protective colloid is polyvinyl alcohol or modified cellulose.

* * * * *